United States Patent [19]
Glover

[11] Patent Number: 4,807,922
[45] Date of Patent: Feb. 28, 1989

[54] IMPACT CAR COVER

[76] Inventor: Ralph S. Glover, 3507 W. Northgate #1101, Irving, Tex. 75062

[21] Appl. No.: 93,966

[22] Filed: Sep. 8, 1987

[51] Int. Cl.$^4$ .............................................. B60J 11/00
[52] U.S. Cl. ................................... 296/136; 296/35.2; 296/98; 296/77.1; 296/81
[58] Field of Search ............. 296/136, 78 R, 81, 35.1, 296/35.2, 98; 428/181

[56] References Cited

U.S. PATENT DOCUMENTS

| | | | |
|---|---|---|---|
| 2,326,713 | 10/1939 | Wesseler | 296/136 X |
| 2,622,051 | 6/1950 | Hermanson et al. | 428/181 X |
| 3,665,355 | 5/1972 | Sasaki et al. | 296/136 X |
| 4,519,644 | 5/1985 | Song | 296/136 |
| 4,589,459 | 5/1986 | Lantrip | 296/136 X |
| 4,699,192 | 10/1987 | Kamen et al. | 296/136 X |

FOREIGN PATENT DOCUMENTS

| | | | |
|---|---|---|---|
| 692827 | 8/1964 | Canada | 296/136 |
| 1139974 | 1/1956 | France | 296/136 |

*Primary Examiner*—Robert B. Reeves
*Assistant Examiner*—Brian Sells
*Attorney, Agent, or Firm*—Leon Gilden

[57] ABSTRACT

A high impact car cover is set forth for use in protecting an automobile housed by the instant invention. An outer vinyl-like covering is laminated to an impact absorbing padding of a thickness in a range of three to five times the thickness of the outer covering and sandwiching the foam-like padding is an underlying vinyl-like flexible covering to provide a high impact automotive covering. A further embodiment of the invention entails the zippered sectioning of the high impact car cover to enable replacement of damaged panels.

1 Claim, 1 Drawing Sheet

U.S. Patent
Feb. 28, 1989
4,807,922
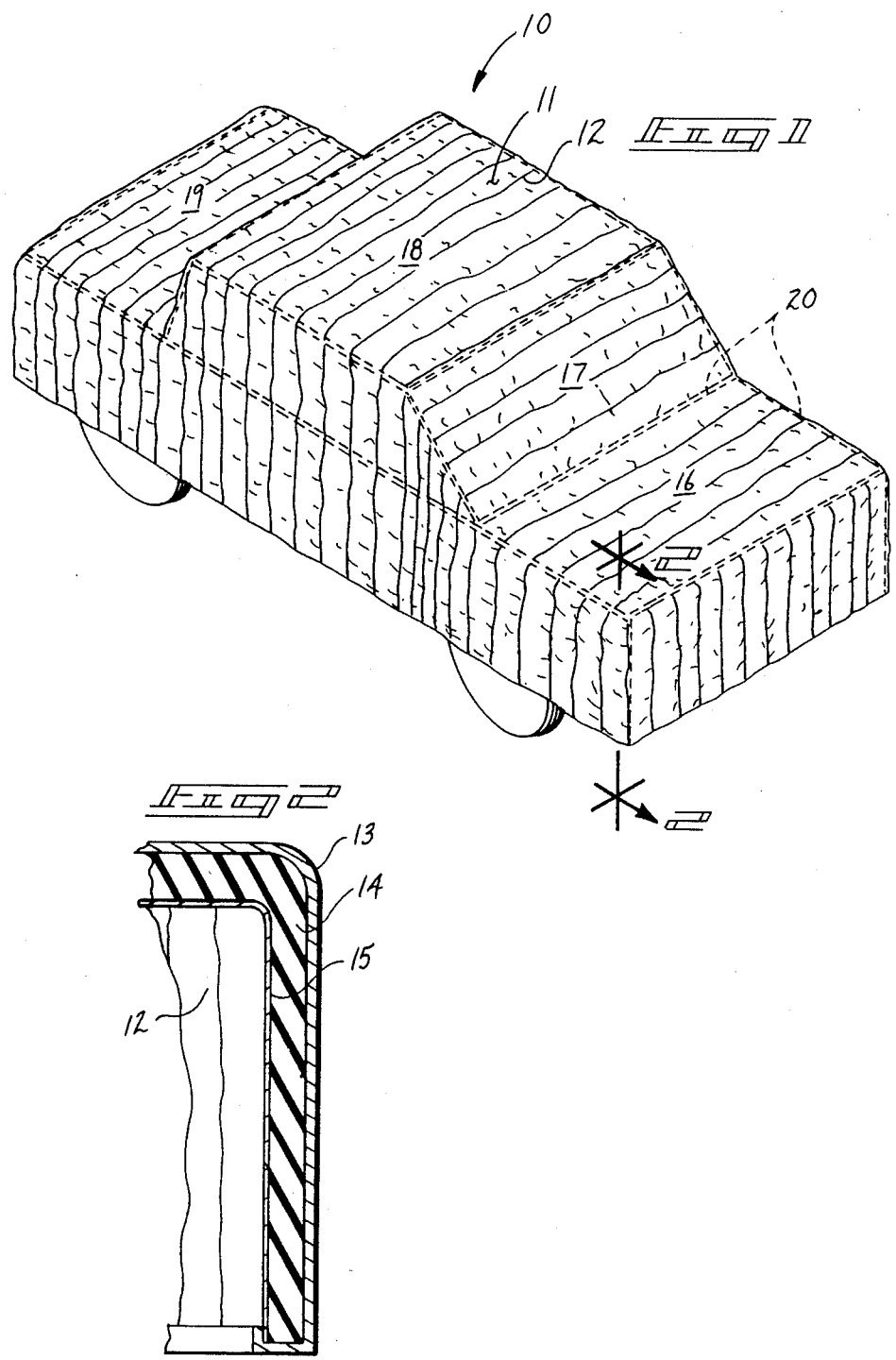

IMPACT CAR COVER

BACKGROUND OF THE INVENTION

1. Field of the Invention

The present invention relates to automotive protective covering devices, and more particularly pertains to a new and improved automotive covering device which is of a multi-layered construction of varying thicknesses and densities of material to provide impact protection for a car thereby enclosed. An alternative embodiment sets forth the use of zippered panels for replacement of portions of the car cover damaged by the aforenoted impact.

2. Description of the Prior Art

The use of car protective covers is well known in the prior art. As may be appreciated, these devices have in the past been of a relatively thin material whose primary function was to provide a modicum of protection to against primarily rain and dust conditions. The field of car top coverings has been expansive in the prior art and has included various relatively complex mechanisms for furling and unfurling of such devices about automobiles. There, however, has been lacking a car protective covering that is of a construction expressly intended for the purpose of protecting the car from high impact incidents and being of a pliable and flexible nature for storage thereof. An example of a prior art device is U.S. Pat. No. 3,021,894 to La Due which discloses a car top covering for enclosing a portion of an automobile only and entailing the use of complex guides and stiffening elements to roll and unroll a cover about a section of an automobile. The invention has failed to address the problem of protecting the car from impact and is essentially concerned with mere covering thereof against moisture and sun exposure.

U.S. Pat. No. 3,050,075 to Kaplan, et al, sets forth another retractable and extensible car top covering device utilizing a series of guideways and tracks along with opposed reeling and unreeling devices to extend a flexible sheer covering about an automobile. While a measure of protection is afforded the automobile against precipitation and solar exposure, it affords no impact protection of the car surface.

U.S. Pat. No. 4,082,347 to Petretti is an example of a flexible covering that is furled and unfurled about an open truck bed and whose citation is to note the use of protective devices associated with mechanical means for motor vehicle protection thereby.

U.S. Pat. No. 4,432,581 to Guma sets forth another in a series of rather complex car covering apparatus which in this instance utilizes attached bracketry to provide runners for a flexible car covering. Additionally, ancillary items such as a snow scraper is utilized in the Guma device but is essentially of limited use in affording impact protection to an automobile's exterior surface.

British patent No. 420,573 to Jones is a similar car covering, as noted in the previously cited reference to Guma and employs a motorized car covering utilized pre-positioned guideways for protection of an automobile with associated stiffening means to provide a level of protection to an automobile. The patent requires the use of a means of maintaining pre-desired geometric configuration and is of relatively limited use in affording impact protection to the automobile.

French patent No. 2,487,739 and French patent No. 2,384,651 are further examples, as addressed by the prior art of means to provide protection to an automobile's exterior surface. The patents are again utilizing flexible material to provide weather protection but of relatively thin construction to effect mere weather proofing of an automobile.

British patent No. 1,115,400 issued to Stelling attempts to provide a greater degree of protection than the other aforenoted prior art devices by the use of relatively rigid materials prepositioned about an automobile by the use of pillars to support the various panels. Arguably, the rigidity of the panels may provide a degree of protection greater than that of a flexible material but is of an awkward and non-fitting nature relative to the automobile as to provide a teaching to be relatively remote relative to the instant invention.

As such, it may be appreciated that there is a continuing need for a new and improved automobile car covering device that addresses the problems of storage, portability, impact resistance, and weather proofing, and in this respect, the present invention substantially fulfills this need.

SUMMARY OF THE INVENTION

In view of the foregoing disadvantages inherent in the known types of automobile coverings now present in the prior art, the present invention provides an automotive car covering providing impact and weather protection for the automobile so enclosed and further providing means for replacing damaged panels of the car covering that may be so damaged through severe impact. As such, the general purpose of the present invention, which will be described subsequently in greater detail, is to provide a new and improved car covering which has all the advantages of the prior art car covering and none of the disadvantages.

To attain this, the present invention is formed of a plurality of laminates wherein the outer laminate is formed of a flexible, vinyl-like material, the intermediate laminate of a foam-like padding of a thickness in the range of three to five times that of the outer flexible vinyl-like covering, and finally provided with an interior flexible member to sandwich the central laminate therebetween. Optional zippered replacement panels are set forth to replace panels that may be damaged during use and furthermore, provide selective removal of such panels to enable a user to operate a motor vehicle utilizing my invention by removal of discrete panels that are associated with the windshield portions of the automobile and thereby may provide visibility during such events, such as hail storms where the windshield may be damaged but the surface of the automobile remains intact to provide mobility during emergency situations.

My device may be utilized for the protection of an automobile parked in a commercial parking area to thereby avoid accidental damage that may be imparted by other automobiles.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved impact car cover which has all the advantages of the prior art impact car covers and none of the disadvantages.

It is another object of the present invention to provide a new and improved impact car cover which may be easily and efficiently manufactured and marketed.

It is a further object of the present invention to provide a new and improved impact car cover which is of a durable and reliable construction.

An even further object of the present invention is to provide a new and improved impact car cover which is susceptible of a low cost of manufacture with regard to both materials and labor, and which accordingly is then susceptible of low prices of sale to the consuming public, thereby making such impact car covers economically available to the buying public.

Still yet another object of the present invention is to provide a new and improved impact car cover which provides in the apparatuses and methods of the prior art some of the advantages thereof, while simultaneously overcoming some of the disadvantages normally associated therewith.

Still another object of the present invention is to provide a new and improved impact car cover formed of a multi-layered construction wherein a relatively thick central laminate is sandwiched by outer flexible laminates.

Yet another object of the present invention is to provide a new and improved impact car cover with replaceable panels that may be selectively removed to obtain visibility for use of the automobile and to enable replacement of damaged panels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the invention illustrating the impact car cover positioned about an automobile and further illustrating in phantom the positioning of zippers to enable replacement of discrete panels of the instant invention.

FIG. 2 is an orthographic view of the invention taken along lines 2—2 of FIG. 1 in the direction indicated by the arrows.

DESCRIPTION OF THE PREFERRED EMBODIMENT

With reference now to the drawings, and in particular to FIG. 1 thereof, a new and improved impact car cover embodying the principles and concepts of the present invention and generally designated by the reference numeral 10 will be described.

More specifically, it will be noted that the impact car cover 10 is formed of an alternating series of raised linear portions 11 and pleats 12. The raised portions 11 and pleat 12 matrix is so configured to firmly position and orient the padded portions and require these segments of padded portions to maintain their positioning and configuration and thereby maintain uniformity throughout the entire impact car cover 10.

With reference to FIG. 2, it will be noted that the outer covering 13 is formed of a plastic-like flexible material of relative impermeability to moisture and deterioration upon exposure to direct sunlight. In laminated relationship to outer covering 13 is a padded central laminate 14 formed of a foam rubber-like material that possesses characteristic resiliency of this class of material. Padded central laminate 14 is so dimensionally configured as to be of a relative thickness in a range of three to five times that of outer covering 13 to provide the requisite resistance to impact. An inner laminate sheet-like material 15 is again of a vinyl-like material and accordingly encase, padded central laminate 14 in cooperation with outer covering 13. The so arranged laminates of outer covering 13, padded central laminate 14, and inner laminate 15 provide an impact shield of a car surface against adverse weather conditions such as hail and will to a large degree provide a car surface from impact in such areas as they may frequently occur, such as parking lots and public parking on streets and the like.

Additionally where the cover is damaged resulting from contact with a severe storm due to weathering over extended seasons, the various panels 16, 17, 18, 19 of the automobile's upper surface are removable to include the hood portion 16, the forward windshield portion 17, the roof portion 18, the trunk portion 19, and the rear windshield portion (unnumbered). Additionally, although of less likelihood, the peripheral side panels may be removable by the use of the same zippered interconnections 20 illustrated in phantom in FIG. 1. The soconfigured network of zippered interconnections 20 enable easy and a panel readily removable and replaceable for replacement or repair, as may be deemed necessary. Additionally for use by an operator, the forward windshield 17 and rear windshield portion may be removed for temporary activation of the motor vehicle to enable transport when situations demand, as from an exposed condition to a sheltered one, for example. Although damage to a windshield may occur, an operator may relocate a motor vehicle to an area of relative safety.

As to the manner of usage and operation of the present invention, the same should be apparent from the above description. Accordingly, the further discussion relative to its manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A high impact cover for a vehicle, said vehicle having a passenger compartment defined by lateral and forward sides, a forward surface, a roof surface, and a rear surface, a forward windshield, a rear windshield, and side windows, said cover comprising:

cover means for covering said surfaces, and said cover means formed of alternating pleats and raised portions, and said raised portions formed of a plurality of layers, and wherein said plurality of layers includes three laminates, and wherein said three laminates define an outer covering formed of a flexible material. and a padded central laminate of contact density, and an inner laminate, and wherein said padded central laminate is of a thickness three to five times that of the said outer covering, and wherein said cover means is further defined by a matrix of interconnected portions in overlying relationship to said surfaces wherein said portions are joined and removable from said cover means by a network of zipper means for selective replacement of various portions of said cover means.

* * * * *